US011522422B2

(12) United States Patent
Sadiku et al.

(10) Patent No.: US 11,522,422 B2
(45) Date of Patent: Dec. 6, 2022

(54) DEVICE FOR PRODUCING ROTORS OR STATORS OF ELECTRIC MACHINES

(71) Applicant: Schaeffler ELMOTEC STATOMAT GmbH, Karben (DE)

(72) Inventors: Sadik Sadiku, Neuberg (DE); Keith Alan Witwer, Fort Wayne, IN (US)

(73) Assignee: Schaeffler ELMOTEC STATOMAT GmbH, Karben (DE)

( * ) Notice: Subject to any disclaimer, the term of this patent is extended or adjusted under 35 U.S.C. 154(b) by 0 days.

(21) Appl. No.: 17/210,580

(22) Filed: Mar. 24, 2021

(65) Prior Publication Data

US 2021/0211026 A1    Jul. 8, 2021

Related U.S. Application Data

(62) Division of application No. 15/781,152, filed as application No. PCT/EP2016/079574 on Dec. 2, 2016, now Pat. No. 10,992,211.

(30) Foreign Application Priority Data

Dec. 2, 2015 (DE) ..................... 10 2015 120 963.2

(51) Int. Cl.
*B23P 19/00* (2006.01)
*H02K 15/04* (2006.01)
*H02K 15/06* (2006.01)
*B21C 47/02* (2006.01)

(52) U.S. Cl.
CPC ......... *H02K 15/0478* (2013.01); *B21C 47/02* (2013.01); *H02K 15/066* (2013.01); *Y10T 29/49071* (2015.01); *Y10T 29/53157* (2015.01)

(58) Field of Classification Search
CPC ......... Y10T 74/18312; Y10T 29/49071; Y10T 29/53157; B21C 47/02; H02K 15/0478; H02K 15/066; H02K 5/02
USPC ................... 29/735, 605, 596, 606, 729, 732
See application file for complete search history.

(56) References Cited

U.S. PATENT DOCUMENTS 7,281,312 B2 * 10/2007 Sadiku ................. H02K 15/066
29/598

* cited by examiner

*Primary Examiner* — Thiem D Phan

(57) ABSTRACT

A method to produce rotors or stators of electric machines having radial grooves into which webs of flat windings having parallel webs and winding heads connecting said webs being pulled, wherein a winding is produced on a rotating, strip-shaped flat former shorter than the winding such that windings are pulled off the former and transferred into a linear transfer device, which transports the windings to a removal position at which the windings are transferred into radial grooves of a rotor or of the transfer tool for transfer into radial grooves of a stator, wherein the former, the transfer device, and the rotor or the transfer tool being jointly rotated about an axis of rotation of the former when rotated to form windings.

13 Claims, 14 Drawing Sheets

DEVICE FOR PRODUCING ROTORS OR STATORS OF ELECTRIC MACHINES

RELATED APPLICATIONS

This application is a Division of U.S. patent application Ser. No. 15/781,152 filed on Jun. 4, 2018, which is a National Phase of PCT Patent Application No. PCT/EP2016/079574 having International filing date of Dec. 2, 2016, which claims the benefit of priority of German Patent Application No. 10 2015 120 963.2 filed on Dec. 2, 2015. The contents of the above applications are all incorporated by reference as if fully set forth herein in their entirety.

FIELD AND BACKGROUND OF THE INVENTION

The present invention relates to a method for producing rotors or coils of electric machines, wherein the rotors or stators have radial grooves into which webs of flat windings with parallel webs and winding heads connecting the latter are inserted, wherein the flat windings are prefabricated on a rotating strip-shaped flat former and the initially flat windings are inserted into the radial grooves of a rotor or a transposing tool for passing on into the grooves of a stator. In such flat windings, flat wires are usually processed, which enable a higher fill factor in the grooves of a stator or rotor than wires with a round cross-section, which favors the overall efficiency of an electric machine with such a rotor or stator. The subject of the present invention is also a device for performing essential steps of such a method, with a winding device which has a winding head with a rotatable former, wire shifters and a wire feed device for generating a winding with multiple turns, consisting of parallel webs and winding heads connecting the latter, and a transfer device, for transposing the winding onto the rotor, or a transposing tool for subsequently transposing the winding onto the stator.

A large number of methods have already been developed for producing corresponding rotors or stators, which primarily relate to the generation of the flat windings themselves. The coil windings consist of a number of intertwined wires which are bent in opposite directions multiple times such that strands of the wires which lie parallel to one another and are specified for filling the grooves are connected by roof-like winding heads which project above the rotors or stators at the front, wherein a flat and rotatable former and a wire handling device are used.

These methods serve primarily to produce a so-called distributed wave winding which can then be placed into the grooves of a stator (or rotor). A distributed wave winding has a plurality of parallel wires which have straight sections which are arranged in the grooves of a stator. These straight sections alternate between an inner and an adjacent outer radial layer in the stator when the wire template moves radially around the stator. This distributed wave template includes a number X of stages or grouped grooves in the stator. Generally, X is a multiple of 3, but constructions are also possible in which X can be any other integer. The number of parallel wires in the winding template of the distributed wave is 2X. In the wave template, the straight sections of the wire from a slot are connected to the straight sections of the wire in the groove, the X grooves are situated apart anticlockwise and clockwise, wherein they are connected by fork-like connecting wires or end bending sections. The wave is created by one of the two connecting end sections being connected to the groove X grooves apart anticlockwise, whilst the associated end bending section is connected, on the opposite side of the stator, to the groove X grooves apart clockwise. These end bending sections alternate because the wire template moves radially around the stator. These fork-like connections also ensure the change of layer between the alternating inner and outer or outer and inner radially adjacent layers of the straight wire sections above the stator grooves for each of the individual wires which form the winding template. The finally prefabricated wire template has 2X parallel wires which are wound in a continuous, distributed, and interwoven wave template which has a flat design. This template has 2X starting wires in an upper layer and 2X end wires in a lower layer. These are simple, straight wire sections. All other straight wire sections between these starting and end wires are formed in pairs with one wire in the lower layer and one wire in the upper layer. The total number of these straight wire sections is determined by the number of conductors which are filled in each groove of the stator construction with this template. The number of conductors in a stator groove must be a multiple of two, the total number of wires in a stator groove to be filled with this template being twice A, where A represents the number of turns by which the winding template is wound around the stator circumference.

A method for producing such a winding is known from EP 1 469 579 B1 which is based on a hexagonal former. However, this method could not be applied in practice because the technical implementation is difficult.

A method is known from DE 10 2014 003 602 A1 which is also based on a relatively complex former which is rotated in 120° steps. A complex winding device, which is difficult to implement technically, is also required for this method.

A further method is known from DE 10 2008 019 479 A1. Here, as already claimed, two winding halves are first wound by means of a flat, strip-like former, wherein the two halves are then interconnected to form the total winding which is then to be inserted into the stator. It is not possible to wind all the wires directly 2X times because, after the displacement which corresponds to the first bending process to produce the bent winding heads by X times the gap between the wires, half of the wires would still collide with the wires in the region of the wire feed. Although it is not especially problematic to put together the two halves of the distributed wave winding, it does represent an additional method step and requires a precise alignment of the two halves relative to each other before they are placed in a store from which they are then placed in the grooves of the stator. The two last steps of placing in a store and transposition into the grooves of the stator are known per se and are also used, in addition to the method proposed here, in order then ultimately to produce the desired stator or rotor using the produced windings.

A method for producing a winding is furthermore known from EP 0 274 969 B1 in which an individual wire is bent to form individual turns successively about rectangular formers arranged on a circulating link conveyor, i.e. one former is provided for each turn. A strip-like individual former rotating about its longitudinal axis to form a winding with multiple turns, and by means of which multiple wires can be processed simultaneously, is not provided, displacement of the winding on the former in its longitudinal direction is not possible, and the individual turns are passed individually to a rotor at the end of the link conveyor, wherein the individual wire needs to be severed many times to form the winding layers.

The aim of a newly developed method, which is however not itself the subject of this application, is to enable the production of the whole coil winding, using a simple former, in a method workflow. Such a method provides the following steps:
A) The parallel simultaneous feeding of wires used for the coil winding in a direction perpendicular to the axis of rotation of the former;
B) Retaining the wires at a fixing point in a first retaining region of the core to be formed on the former;
C) Retaining the wires at a fixing point in a second retaining region at a distance from the former with respect to the feed direction;
D) Displacing the first retaining region of the former relatively with respect to the second retaining region, parallel to the axis of rotation of the former by an amount of travel, the length of which is approximately equal to, or is equal to, half the distance from the outermost wires, as a result of which a wire section inclined with respect to the core is formed between the first and the second retaining region;
E) Rotating the former by 180°, the retaining point from the first retaining region being shifted into a third retaining region on the side of the former opposite the first retaining region, and the retaining point from the second retaining region being shifted into the first retaining region;
F) Fixing the wires which are guided later at the fixing point in the second retaining region;
G) Before or after step F, removing the retaining effect in the third retaining region;
H) Displacing the first retaining region relative to the second retaining region parallel to the axis of rotation of the former by an amount of travel, the length of which is approximately equal to, or is equal to, half the distance from the outermost wires, as a result of which a wire section, inclined with respect to the core, is formed;
I) Rotating the former by 180°, the fixing point in the first retaining region in turn being shifted into the third retaining region on the side of the former opposite the first retaining region, and the retaining point in the second retaining region being shifted into the first retaining region;
J) Repeating steps F to I until the coil winding is complete;
K) Displacing relatively for the last time the first retaining region relative to the second retaining region, parallel to the axis of rotation of the former by an amount of travel, the length of which is approximately equal to, or is equal to, half the distance from the outermost wires, as a result of which a wire section, inclined with respect to the core, is formed between the first and the second retaining region;
L) Severing the wires at the second retaining region;
M) Completely or partially stripping the coil winding from the former.

It is known from EP 1 639 688 B1 to insert the flat windings into a stator or rotor for an electric machine. For this purpose, after it has been produced, the winding is brought into a strip-like holder and then pressed from there into the stator or into a transposing tool. It has, however, been shown that the use of rod- or strip-like holders is inconvenient for the method workflow because they need to be very long in order to be able to receive the complete flat windings, for example from a former. Automating such a workflow is very difficult and requires a very large amount of space, and previous workflows do not lend themselves to being combined on more compact machines owing to the movements in the different method steps with different degrees of freedom, and owing to the large length of the workpieces of the delicate windings.

SUMMARY OF THE INVENTION

The object of the invention consists in providing a method which can be automated simply and with a reduced space requirement.

The main features are provided in the subject matter of the independent Claim(s). Embodiments of the method are the subject of the dependent Claims.

The shortened design of the former, together with the transfer device, makes it possible to insert the winding with its already generated turns into the radial grooves of a rotor or a transposing tool for subsequent transposition into the radial grooves of a stator. Because more and more new turns must be generated in this stage by the former rotating relative to a wire feed, all the equipment involved in performing the method, with the exception of the wire feed, is rotated together with the former during these forming procedures such that the winding per se cannot be deformed and continuous transfer from the former to the co-rotating rotor or the co-rotating transposing tool is achieved. The co-rotating transfer device also changed its relative position with respect to the former and the rotor/transposing tool only with respect to its axial conveying movement which takes place stepwise with the advance of the winding on the former.

Accordingly, the method is preferably configured so that the winding is generated by wire webs, lying on the former, of the respective turn being displaced alternately with respect to the fed wires and the former being rotated by 180°, and by the transfer device being adjusted during the displacement by a corresponding amount of travel parallel to the axis of rotation of the former, and by the rotor or the transposing tool being rotated synchronously about its own central axis of rotation.

In a further embodiment of the method, it is provided that the winding heads of the winding are clamped between displacement procedures after leaving the former. As a result, the winding is stabilized in the critical transition region after the short former, which is particularly advantageous in the case of inherently unstable windings.

It can furthermore be advantageous if the winding heads are formed in the transfer device between the displacement between two forming halves. There is generally sufficient space available at this location to arrange corresponding tools which can likewise rotate with the other equipment.

Cams which are known in principle from EP 1 639 688 B1 can be used for transposing the winding from the transfer device into the rotor/transposing tool, wherein the first and second cams, which are advantageously employed separately, can be designed spatially so that they are separate from each other. The cams can be moved actively back and forth in order to assist the transposition in the appropriate direction and/or have slopes in the direction of movement of the winding such that the arriving windings are first lifted up with their turns out of the transfer device and then pressed into the radial grooves.

In a particularly preferred development of the method, the turns of the winding are deposited in the transfer device in holders which are designed on and/or between links of a link chain, wherein the link chain is guided linearly over the region between the former and the transposing tool or the rotor.

This embodiment enables a space-saving design of the transfer device which can readily be many times shorter than the total length of the winding. The method can thus be performed in a small space. Rigid holders which are associated with a link enable a particularly precise configuration, whilst holders which are present between links in the stretched region of the chain make it possible to have a simpler link chain, wherein a combination of both variants is readily possible such that, for example, only every second holder is formed rigidly on a chain link, whilst the intervening holders are designed in the linear region between adjacent chain links. The link chain is preferably driven via at least one toothed or cam wheel, which engages in form-fitting fashion with said link chain, in order to ensure a particularly precise positioning of the chambers in the method.

It is furthermore preferably provided that the turns are guided with the aid of transposing pins engaging between the latter during transposition into the transfer device. This measure, in which the transposing pins actively assist the displacement of the turns or just prevent unintentional deformation of the turns, ensures precise depositing of the turns in the holders of the transfer device.

This preferably occurs because the transposing pins are moved in engagement with the turns during the displacement with the turns, and are moved out of engagement with the turns between the displacement procedures and returned to their starting position.

Lastly, a further method step can be provided in which insulating strips are inserted between stages of the turns between the generation of the turns on the former and the transposition of the turns into the transfer device. For this purpose, although the former may need to be designed so that it is somewhat longer, this configuration nevertheless has the advantage that all the winding heads are situated in a defined position at this point of the method, which greatly simplifies the insertion of the insulating strips made from insulating paper or plastic.

As has already been mentioned at the beginning, the subject of the present invention is also a device by means of which the method according to the invention can be performed.

Accordingly, a device with the features of the independent claim(s) is provided, the characterizing features of which consist in the former being shorter than the winding to be generated and a rotating device being provided which effects a synchronous rotation of the former, the transfer device, and the rotor or the transposing tool about the axis of rotation of the former at least when the winding extends from the former to the rotor or the transposing tool. In this way, the method remains can be performed continuously in the device, from the generation of the individual windings to the finished rotor or the transposing tool which is already loaded for transposition to the stator.

As already explained in connection with the method, the transfer device preferably has parallel holders for the turns of the winding, wherein the holders are designed on or between adjacent links of a link chain, wherein the link chain between the former and the rotor/transposing tool is preferably guided in a linearly stretched fashion between two deflecting rollers. The chain can also be assisted in this region by a track which allows precise linear guidance without the link chain being stressed highly.

It has likewise already been mentioned that first cams for transposing the turns from the transfer device into the radial grooves of the rotor/transposing tool, and/or second cams for displacing the turns into the radial grooves, are preferably provided radially on the inside.

The preferred development of the invention according to which the first and/or second cams can move in an adjustable fashion perpendicular to the direction of movement of the turns and/or have slopes in the direction of movement of the turns, has also already been discussed.

A preferred development of the cams which provides that the first and/or second cams are designed in the form of ribs or disks and engage, through slots which run in the direction of movement of the transfer device or the direction of rotation of the transposing tool, into the holders in the transfer device or the radial grooves of the transposing tool, is particularly advantageous. As a result of this configuration, the turns can be grasped particularly well by the cams and move in a defined fashion into a specific layer in the grooves of the rotor or the transposing tool.

The preferred embodiments of the device with transposing pins, a wave head forming device in the region of the transfer device and/or a wave head clamping device at the transition point from the former to the transfer device have already been described in connection with the method.

A further preferred embodiment provides a bearing housing in which a transfer unit, with which a rotary bearing for the rotor/transposing tool and the transfer device is associated, is mounted so that it can rotate about the axis of rotation of the former. The transfer unit and the former can but do not need to be permanently coupled to each other in a torsionally rigid fashion, and a switchable torsionally rigid connection by means of a coupling or an electronic synchronization is also possible.

With respect to the movement sequence, it is advantageous that all movement sequences of the device which are connected with the handling of the winding are synchronized mechanically by a main shaft or electronically by a suitable sensor system for detecting the movements in connection with movements controlled by servomotors.

BRIEF DESCRIPTION OF THE SEVERAL VIEWS OF THE DRAWINGS

Further features, details, and advantages of the invention become apparent from the text of the claims and from the following description of exemplary embodiments with the aid of the drawings, in which:

DESCRIPTION OF SPECIFIC EMBODIMENTS OF THE INVENTION

Figure 1:
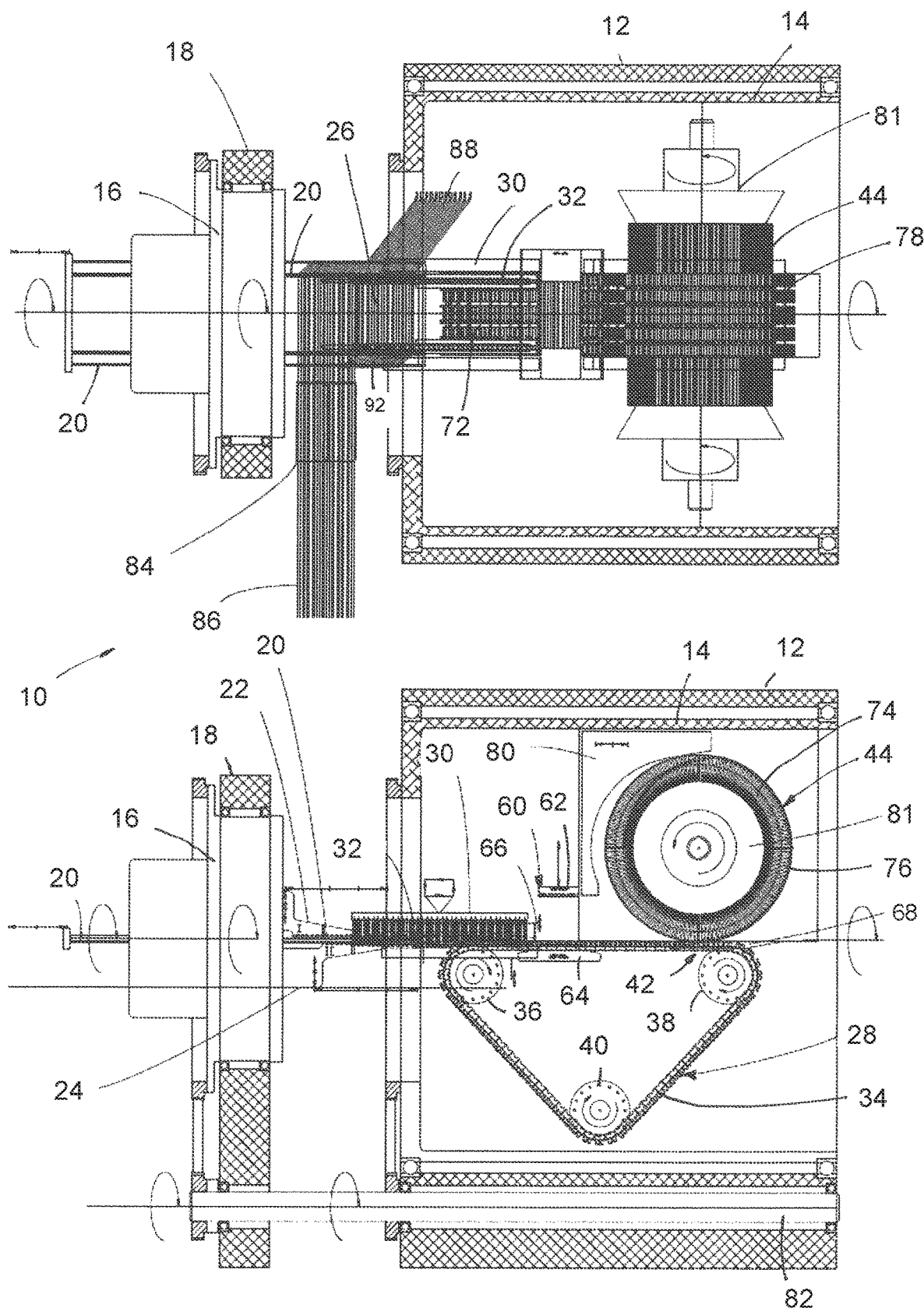
FIG. 1 shows a schematic plan view and side view of a device for equipping a transposing tool in a starting position.

A device for producing a rotor or stator for an electric machine is shown in FIG. 1, wherein, when a stator is produced, in fact a further method step which is not shown needs to take place, in which the winding is transposed into the stator of the machine from a transposing tool 44 which is equipped with the winding in the device shown. Such a method is known in principle, for example, from EP 1 639688 B1 which at this point is expressly included in the disclosed content of this application.

The schematically illustrated device 10 has a bearing housing 12 in which a transfer unit 14 is mounted so that it can rotate concentrically with a winding head 16, wherein the latter is likewise mounted in the bearing housing 12 or a separate bearing block 18, as illustrated in the drawings.

A former 20 is guided in a torsionally rigid but axially adjustable fashion in the winding head 16, wherein the axis of rotation runs through the center of the strip-like former 20. Furthermore, two wire holders/shifters 22, 24 are held in the winding head 16 so that they can be adjusted axially and radially with respect to the axis of rotation, which in each case are associated with a flat side of the former 20 and are arranged correspondingly excentrically with respect to the axis of rotation, as can be clearly seen in each case from the lower view in the drawings. In this respect, the winding device corresponds to known embodiments, with the exception that the former 20 is here designed so that it is considerably shorter than the length of the winding 20 which is to be generated as a whole, only two turns of which in the region of the former are shown schematically in all the drawings in order to make the views clear.

In order to transfer the windings generated on the former into a transfer device 28, transposing pins 32 arranged on a common support 30 are provided. The transposing pins 32 with its support 30 are also associated with the rotatable transfer unit 14, and the whole transfer device 28. The support 30 can be adjusted radially and axially with respect to the axis of rotation, as will be described in detail below.

Figure 2:
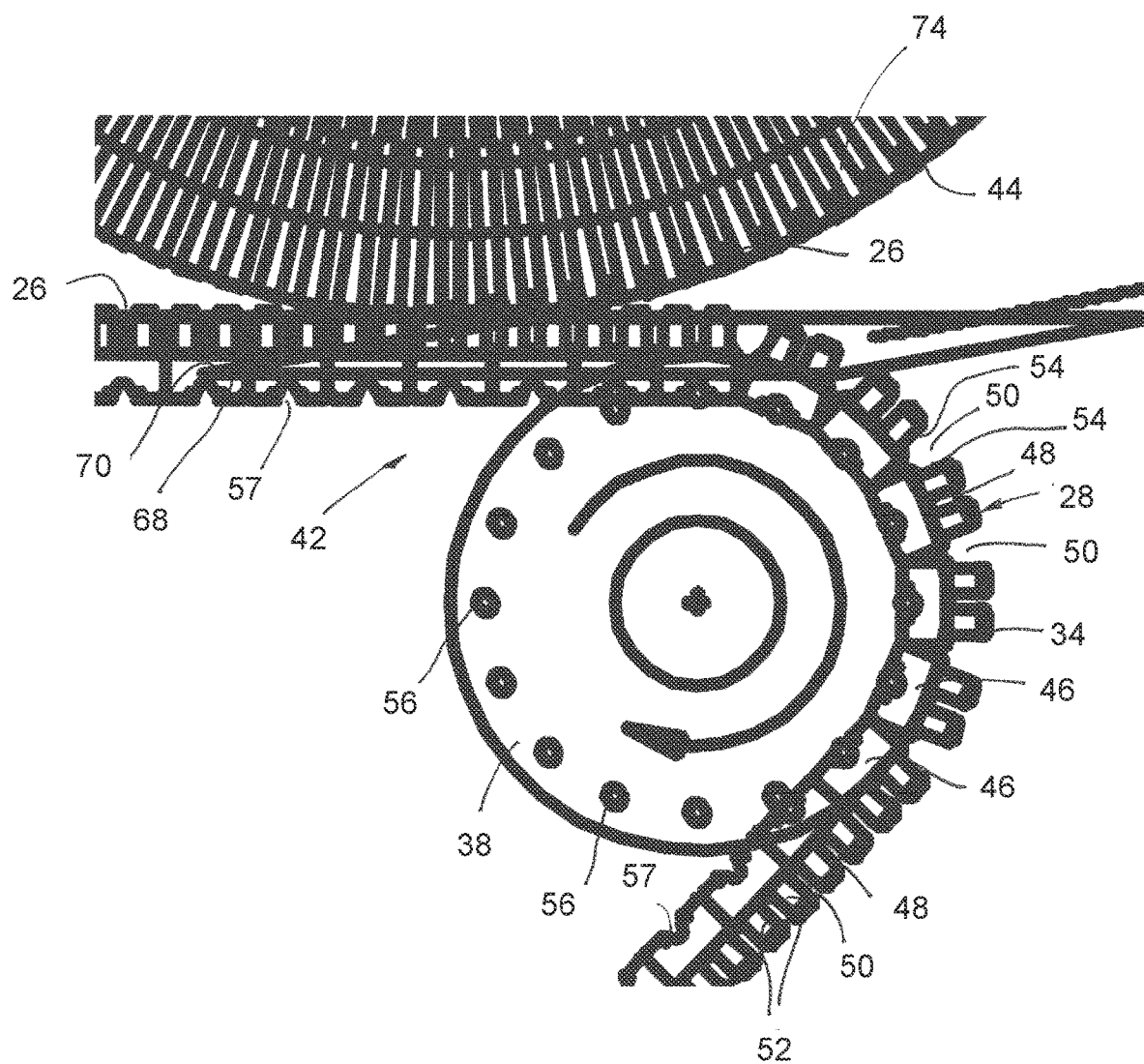
FIG. 2 shows an enlarged detail of the transition point of the device from FIG. 1.
Figure 3:
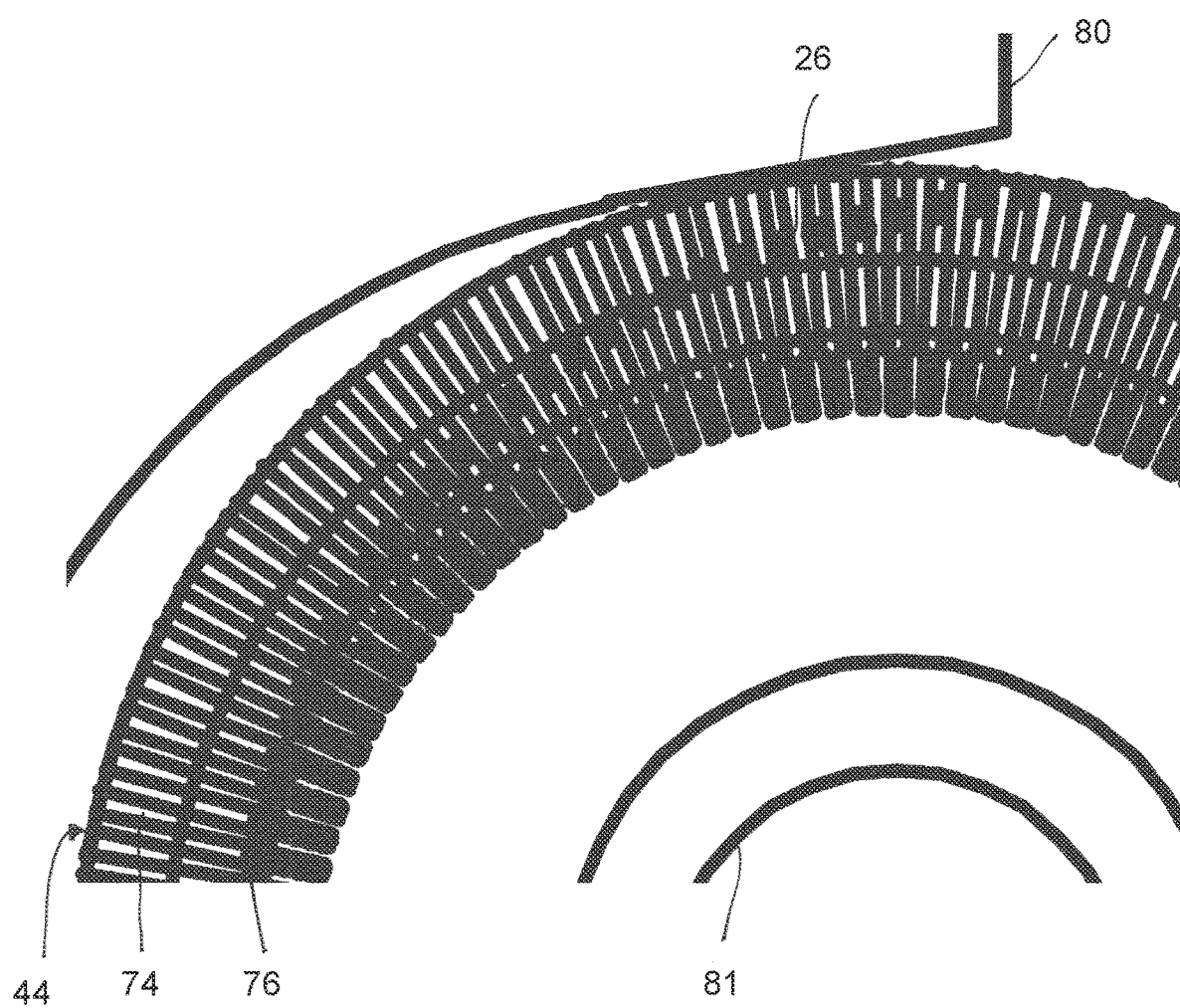
FIG. 3 shows a further enlarged detail from FIG. 1.

The transfer device 28 has a circulating link chain 34 which is deflected over in this case three deflecting rollers 36, 38, and 40. The link chain 34 is tensioned linearly between a first deflecting roller 36 and a second deflecting roller 36 so that the winding 26 can be flattened and transported without being bent in a region between the former 20 and a transition point 42 to a transposing tool 44. In order to be able to hold the winding securely, rigid and variable holders 48 and 50 are designed on and between chain links 46 of the chain 34. The rigid holders 48 in each case take the form of inner walls 52 of the respective chain links 46 which are formed so that they are rigid relative to one another, whilst the variable holders 50 are designed so that they are between outer walls 54 of adjacent chain links 46 when the link chain 34 is stretched linearly (see also here FIGS. 2 and 3). The link chain 34 is carried along in a form-fitting fashion, wherein this happens in the exemplary embodiment shown by means, for example, of transport pins 56 which engage in suitable recesses 57 on the chain links 46. Any of the deflecting rollers shown are suitable in principle as the driven deflecting roller, preferably the third driving roller 40, wherein a plurality of driven rollers can also be considered. A separate drive which interacts in a form-fitting fashion with the link chain 34 at a point between the deflecting rollers is, of course, also possible.

A cam track 58, which ensures that the level of the winding 26 in the holders 48, 50 of the transfer device 28 corresponds approximately to the middle level of the former 20, is provided in the transition region between the former 20 and the transfer device 28.

A winding head forming device 60, which has a movable forming tool 62 and a template 64 arranged below the link chain 34, is provided between the former 20 and the transposing tool 44. The winding head forming device 60 is also designed so that it rotates together with the transfer unit 14. A clamping device 66 for the winding heads of the winding is moreover provided in the region of the template, wherein said clamping device holds the winding in place with respect to the transfer device 28 when the transposing pins 32 are retracted and cannot stabilize the winding 26 themselves. The clamping device 66 rotates with the transfer device 28 but, like the winding head forming device 60, cannot move axially.

A short distance upstream from the second deflecting roller 38 in the transporting direction, first disk-like cams 68 engage with slopes 70 (see FIG. 2) through slots 72 in the link chain 34 and lift up the winding 26 during an advancing movement of the transfer device 28 such that the corresponding windings are lifted out of the holders 48, 50 of the link chain and pressed into radial grooves 74 in the already described transposing tool 44.

The transposing tool 44 essentially consists of an annular support 76 with the already mentioned radial grooves 74 which are widened axially. The radial grooves 74 are interrupted by slots 78 oriented perpendicularly thereto and in which adjustable, second disk-like cams 80 can engage. The transposing tool 44 is clamped in a driven rotational guide 81 which is designed so that it can rotate together with the transfer unit 14. It furthermore has a rotational drive (not shown) which rotates the transposing tool 44 synchronously with the advance of the transfer device 28.

A main shaft 82 is provided in order to synchronize the movements of all of the interacting pieces of equipment inside the device and in particular synchronize the rotating movement between the winding head 16 and the transfer unit 14, wherein the mechanical synchronization can also be replaced by electronic synchronization with sensors for position detection and electronically activated servomotors.

A wire guide 84, which does not rotate together with the former 20 and the transfer unit 14, is arranged which extracts the wires 86 for the winding 26 from a wire supply (not shown) and leads them toward the former 20. The wire guide also has the function of a clamping device and can be moved at least in two degrees of freedom of a notional radial plane with respect to the axis of rotation of the former.

An insulating station, which introduces electrical insulation between wires with different phases, can be provided between the wire shifters 22, 24 and the transposing pins 32, this being possible at this point without extending the cycle times. The former may need to be configured so that it is slightly longer in order to free up sufficient axial space to install the insulating station.

Starting from FIG. 1, a cycle for producing a winding is described below which is repeated multiple times until the complete winding is generated. The particular steps at the beginning of the production process and the end are not explained in detail. The winding is shown schematically with connecting wires 88 and just two generated windings but the description refers to a winding 26 which has already been generated with a sufficiently large circumference that it extends into the radial grooves 74 of the transposing tool 44, and the connecting wires are actually already situated correspondingly in a position protruding laterally above the transposing tool 44. Accordingly, the positions shown should be disregarded in the following considerations.

In the situation shown in FIG. 1, the wires 86 are oriented so that they are flush with the former 20, wherein the wire guide 84 is arranged at a certain distance from the former 20 and the wires are also clamped there. A first wire shifter 22 on the upper side of the former 20, according to the view, holds the wires on the former, whilst on the underside of the former the second wire shifter 24 is extended further axially with respect to the winding head 16 and also holds the wires which run there on the former 20.

Further in the process, the transposing pins 32 are situated in the transition region to the transfer device 28 engaging with the windings on the upper side of the former, i.e. the pins engage between the turns and stabilize them. The clamping device 66 is opened and the winding head forming device 60 is situated in a rest position.

Further in the process axially, the winding 26 is held in the holders 48, 50 of the link chain 34 and then runs further in the radial grooves 74 of the transposing tool 44, wherein the turns initially lie radially on the outside and are then arranged further inward, after the second cams 80 in the direction of rotation, wound radially one over the other.

Figure 4:
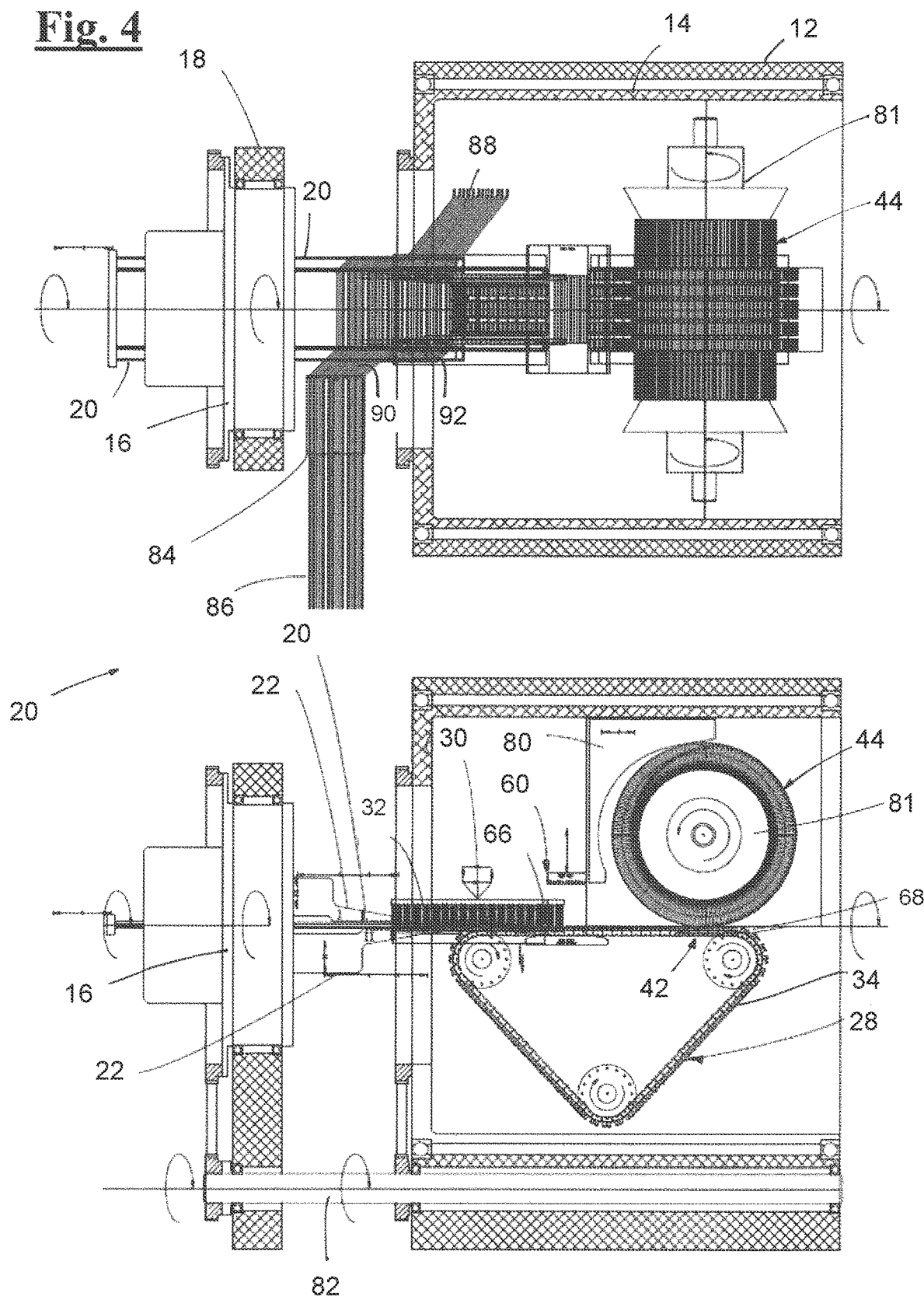
FIG. 4 shows a view of the device after a shifting/forming process of the winding.

In a first step, the end state of which is shown in FIG. 4, the first and second wire shifters 22, 24 are moved axially out of the winding head 16 by an amount of travel corresponding to the width of half a turn. The transposing pins 32, the link chain 34, and the transposing tool 44 move synchronously, the latter being rotated by an angle which corresponds to a travel of the outer circumference that is equal to the axial advancing travel. The former 20 is also moved by a corresponding amount of travel such that there are no relative movements between the already wound wires 86 and the former 20 in this step.

An inclined wire section 90 is generated with this step between the wire feed 84 and the first wire shifter 22, from which a winding head 92 of the winding is later bent.

Figure 5:
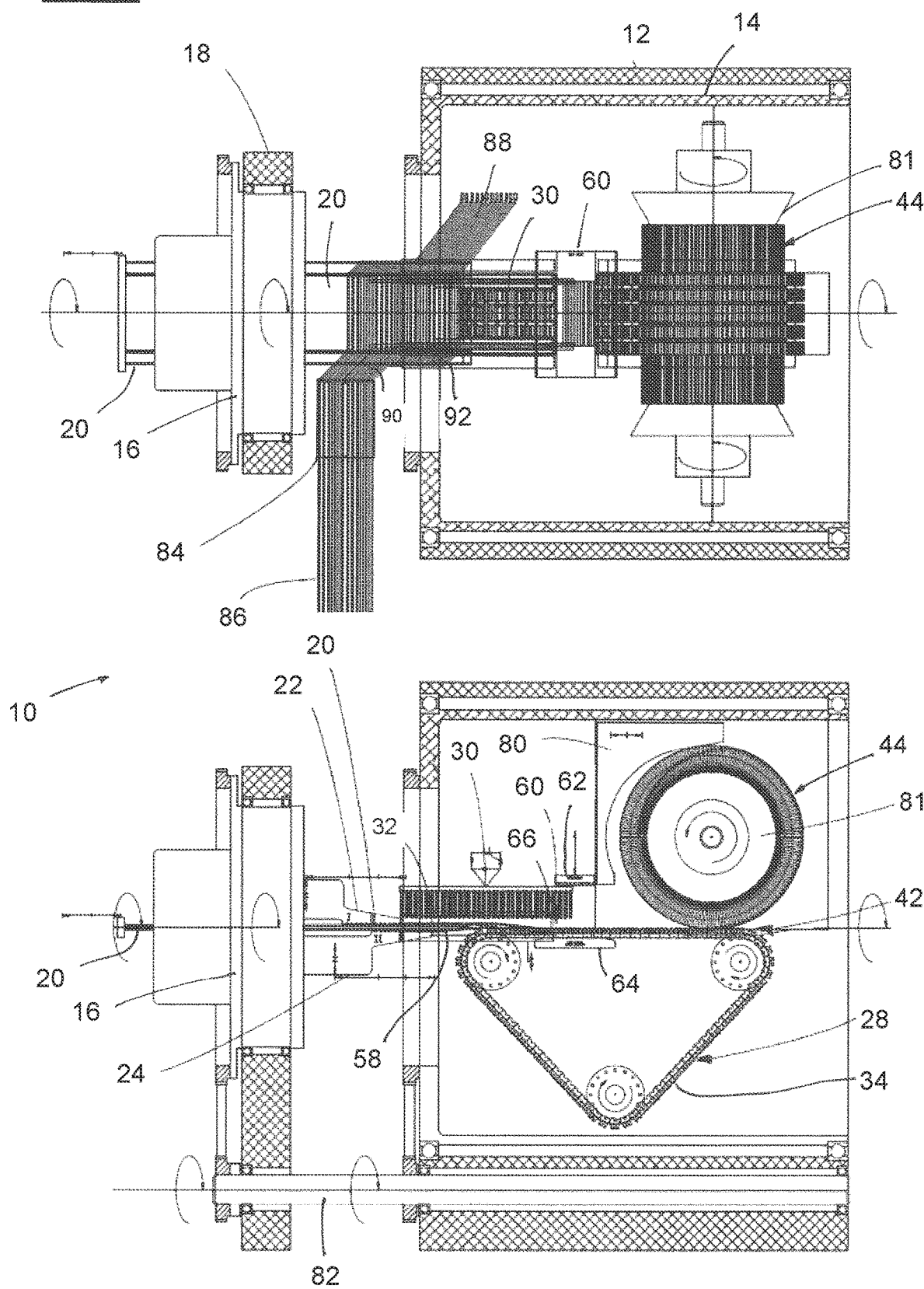
FIG. 5 shows a view of the device with retracted transposing pins.
Figure 6:
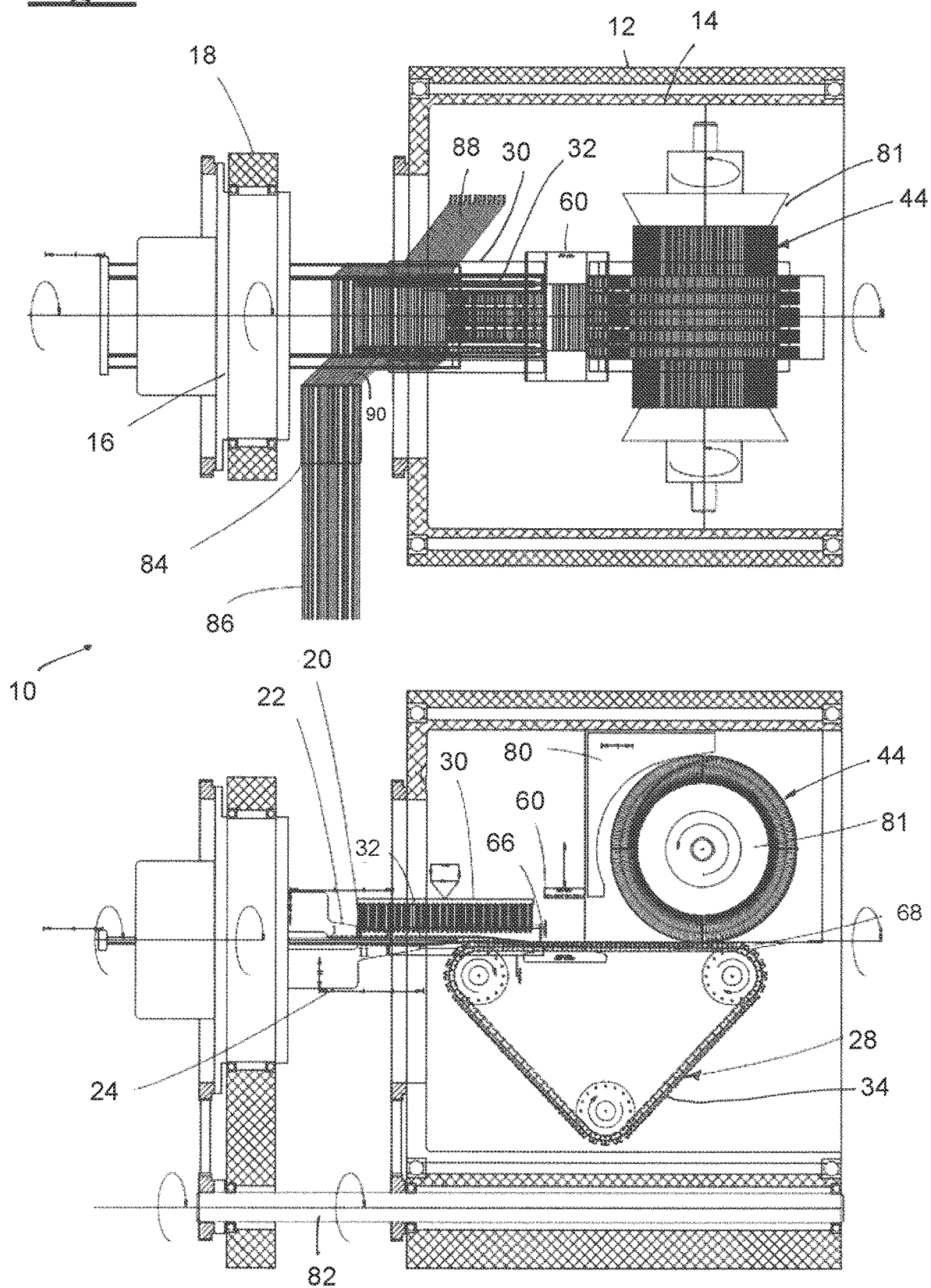
FIG. 6 shows a view of the device with repositioned transposing pins.

After this step is complete, the clamping device 66 is closed and clamps the winding heads 92 lying there, whilst the transposing pins 32 are disengaged from the turns. The corresponding end state is illustrated in FIG. 5, wherein, starting from this state, the transposing pins 32 are moved axially toward the winding head 16 back into their initial position (see FIG. 6).

Figure 7:
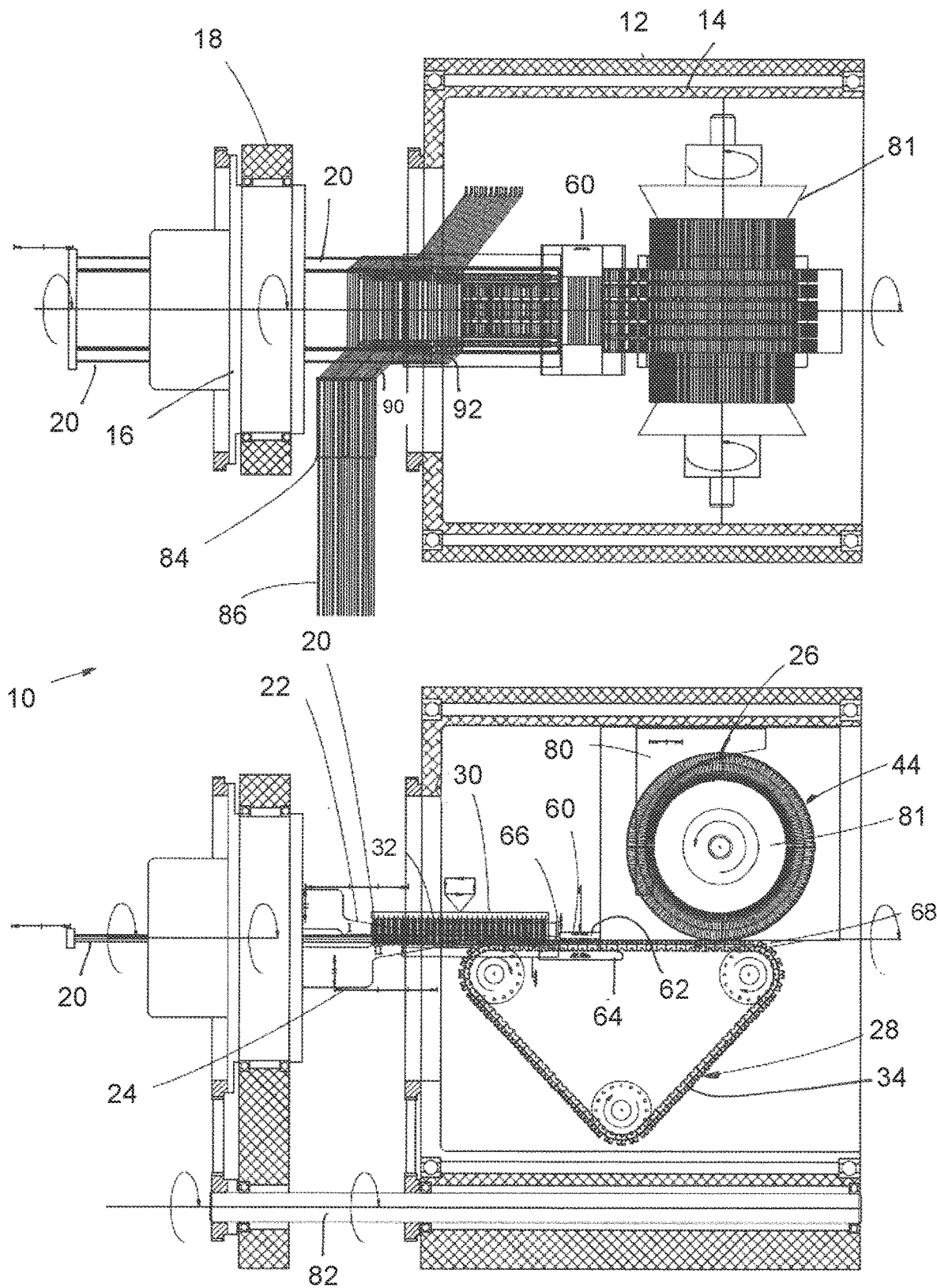
FIG. 7 shows a view of the device with re-engaging transposing pins, retracted former, and activated winding head forming device.
Figure 8:
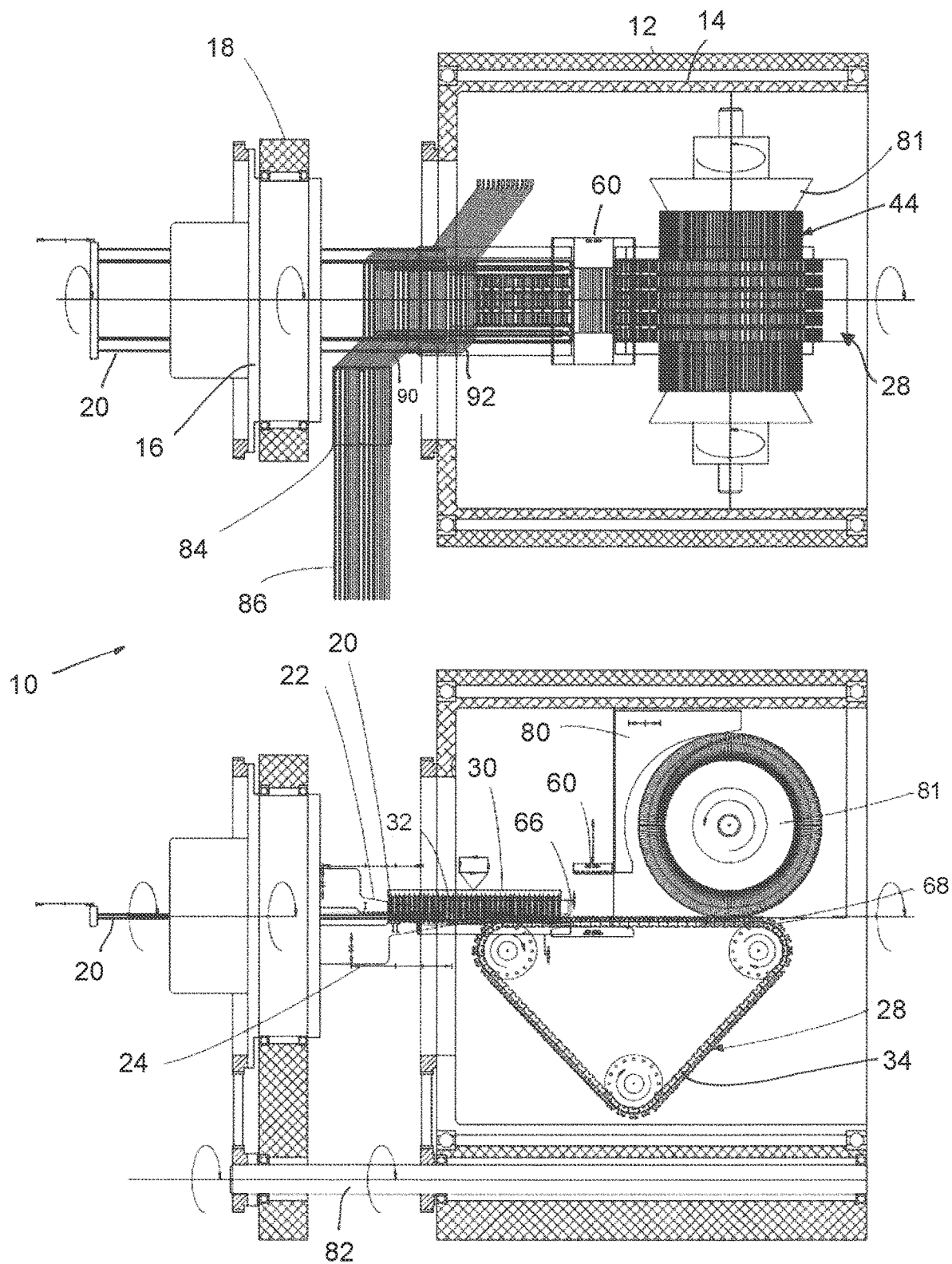
FIG. 8 shows a view of the device with opened winding head forming device.

In order to achieve the state shown in FIG. 7, the transposing pins 32 are reengaged in the turns, the axially stationary clamping device 66 is opened and the winding heads lying in the region between the forming tool 62 and the template 64 are brought into their final form by means of the winding head forming device 60. Furthermore, the former 20 is moved backward counter to the feed direction in the advancing step, wherein the turns are, as it were, stripped off at the end of the former 20 such that they can subsequently be transposed into the holders 48, 50 of the link chain 34. Also, shortly afterwards, the second cams 80 are advanced toward the transposing tool 44 such that the disk-shaped cams 80 engage in the slots 78 and press the turns which run there more deeply into the radial grooves 74 such that, where already present, they lie on the winding layer situated underneath. The turns can also be pressed in radially after the shifting procedure according to FIG. 4 is complete, but in any case there are no strict requirements for a specific time sequence for the individual steps in FIGS. 4 to 8. FIG. 8 shows the device after the winding head forming device 60 has been opened and the second cams 80 retracted. The second cams 80 can alternatively also be guided later such that they remain in the grooves and, according to the layer height of the already introduced winding, are moved slowly radially outward at the same time as the feed movements.

Figure 9:
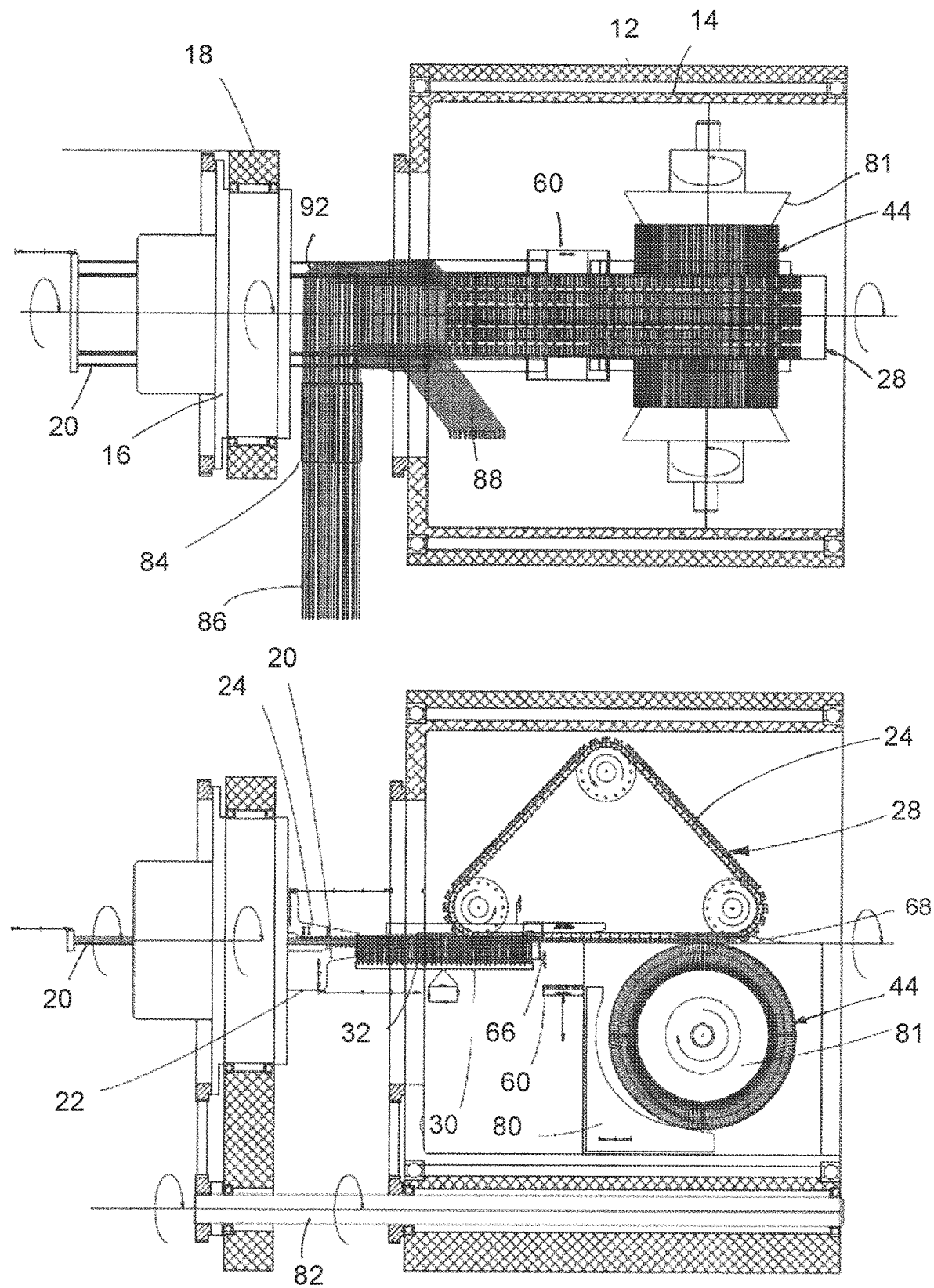
FIG. 9 shows a view of the device after a winding process with a transfer unit rotated by 180°.
Figure 10:
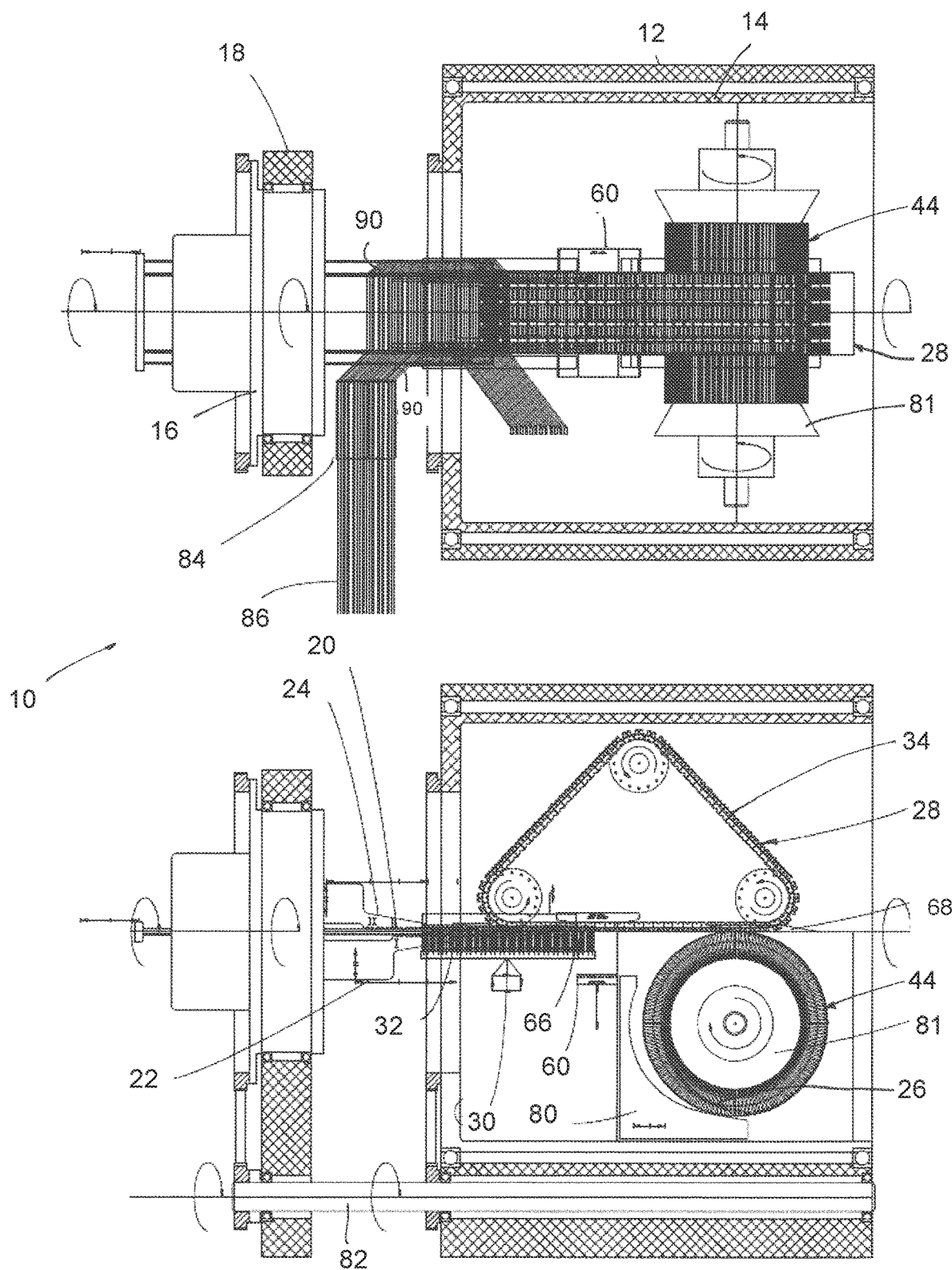
FIGS. 10, 11, 12, 13 and 14 show the working steps illustrated in FIGS. 4 to 8 with a transfer unit rotated by 180°.
Figure 11:
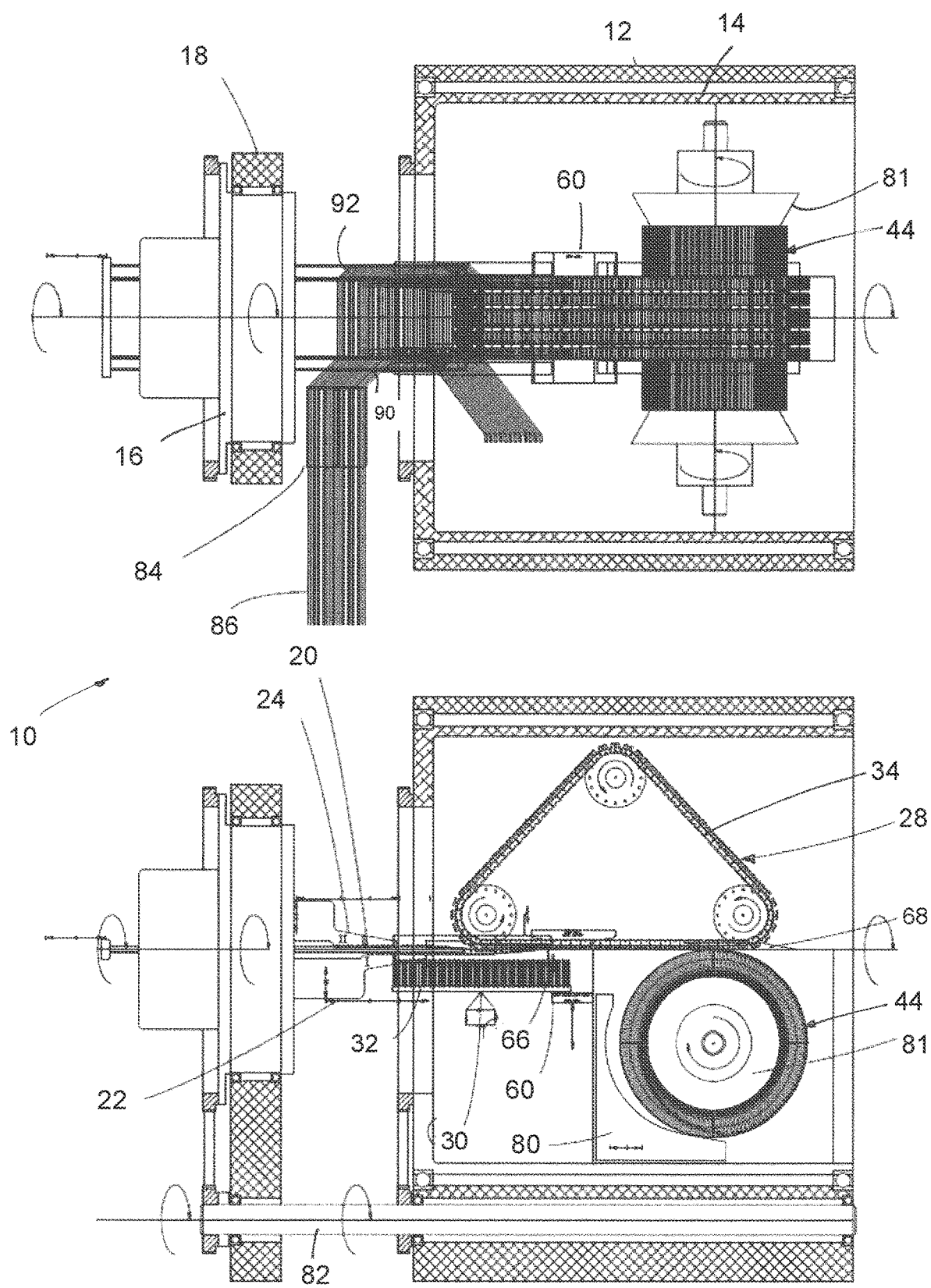
Figure 12:
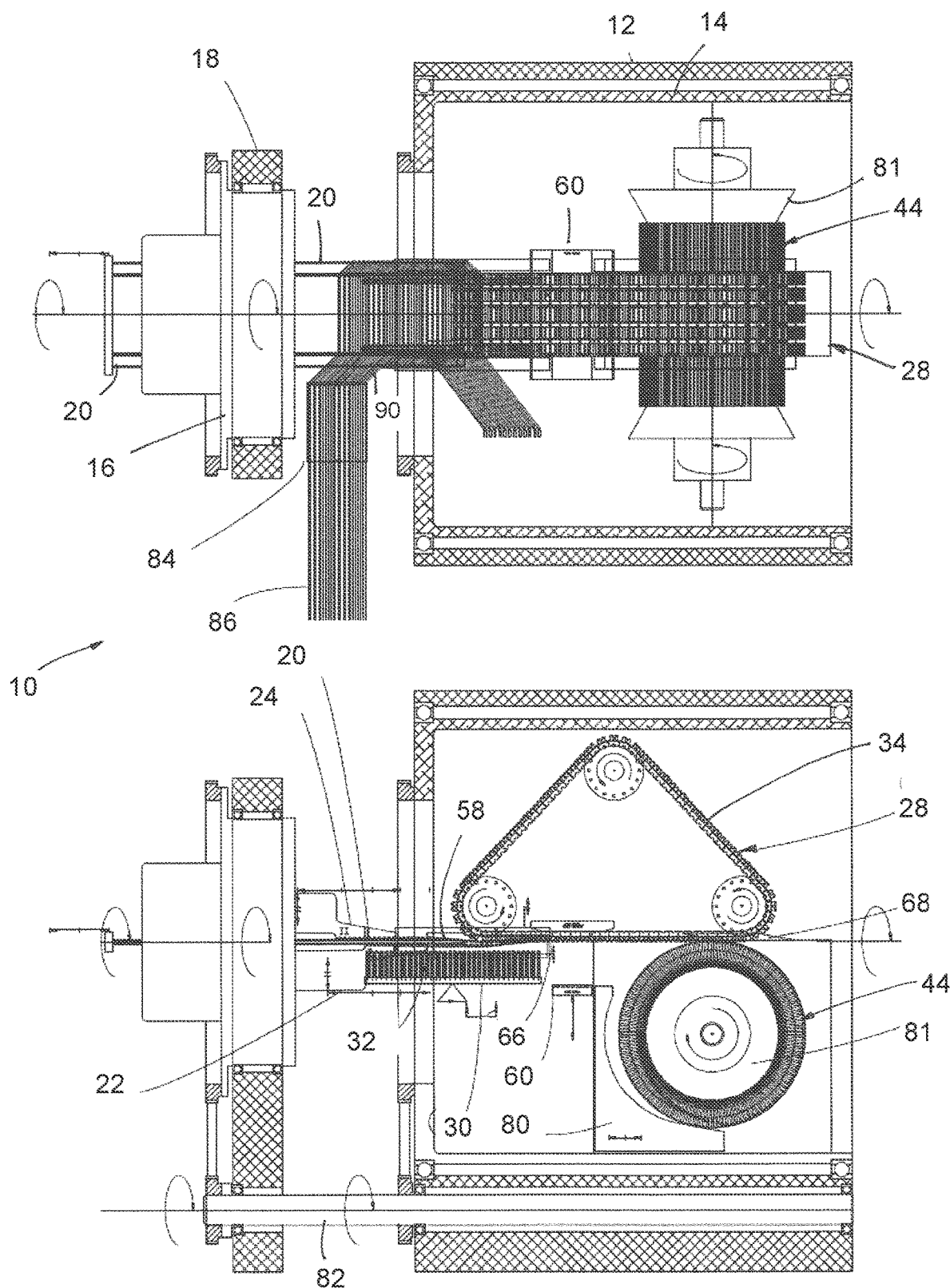
Figure 13:
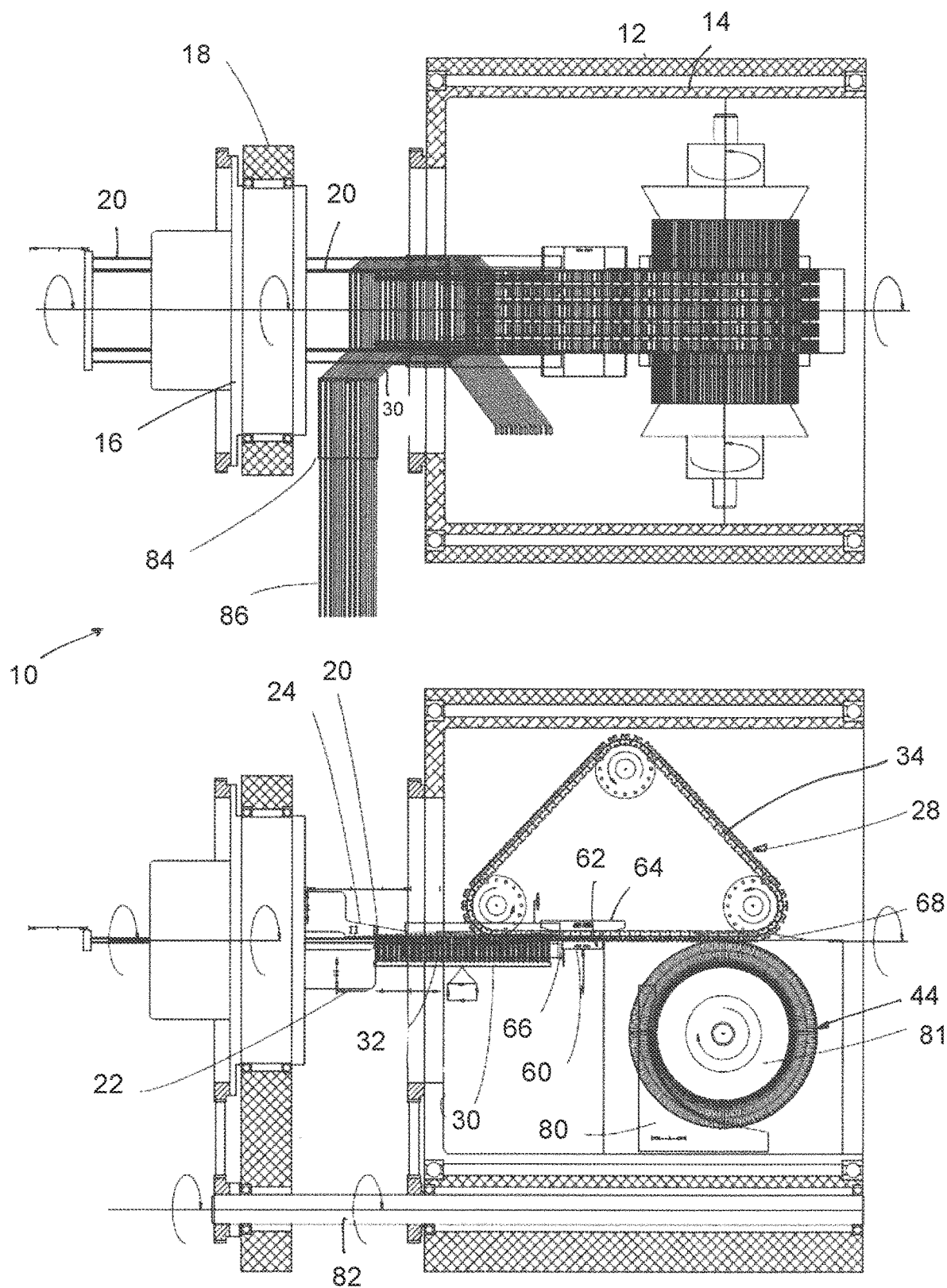
Figure 14:
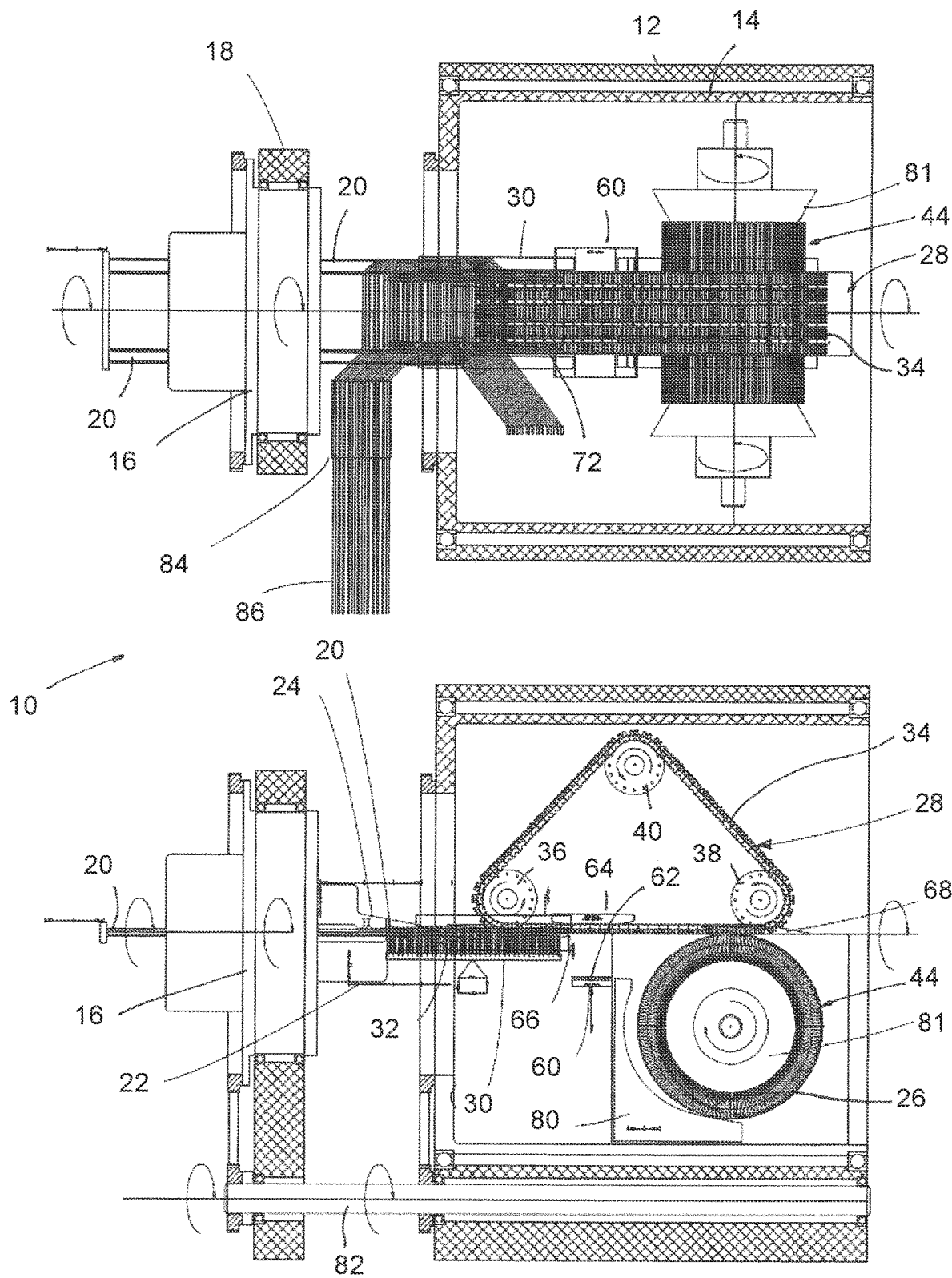

In the transition to FIG. 9, the second (in this case lower-lying) wire shifter 24 is lifted off the former 20 and then pulled backward axially into the winding head such that the former 20 is freed for a further half-turn, which is generated by the former 20 rotating by 180°. At the same time, the whole transfer unit 14 is rotated, with the transposing pins 32, the winding head forming device 66, the transfer device 28 and the rotational guide 81 with the clamped transposing tool 44, about the axis of rotation of the winding head. The rotating procedure can also be carried out at an earlier point in time. With the rotating procedure, the wire guide first moves onto the former in a curve-like fashion, before it is pulled back into the clamping position shown in FIG. 10 and clamped again to the wires 86. The second wire shifter 24, which is now situated in the upper position, is extended axially and takes hold of the wires 86 lying on the former in order to prepare the next displacement procedure. Apart from the transfer unit 14 which stands on the head and the swapped wire shifters 22, 24, the state according to FIG. 10 thus corresponds to the state shown in FIG. 1. After the rotating procedure, the in principle identical sequence of working steps according to FIGS. 11 to 14 accordingly happens next, before, after repeated rotation, the initial state according to FIG. 1 is restored, with the difference that a further turn has been transposed to the transposing tool.

The invention is not limited to one of the abovedescribed embodiments but can be modified in many different manners, wherein all of the features and advantages arising from the claims, the description and the drawings, including structural details, spatial arrangements and method steps, can be essential to the invention both per se and in a wide range of combinations.

LIST OF REFERENCES 10 device
12 bearing housing
14 transfer unit
16 winding head
18 bearing block
20 former
22 first wire shifter/holder
24 second wire shifter/holder
26 winding
28 transfer device
30 support
32 transposing pins
34 link chain
36 first deflecting roller
38 second deflecting roller
40 third deflecting roller
42 transition point
44 transposing tool
46 chain links
48 rigid holders
50 variable holders
52 inner walls
54 outer walls
56 transport pins
57 recesses
58 cam track
60 winding head forming device
62 forming tool 64 template
66 clamping device
68 first cams
70 slopes
72 slots in link chain
74 radial grooves
76 annular support
78 slots in transposing tool
80 second cams
81 rotational guide
82 main shaft
84 wire guide
86 wires
88 connecting wires
90 inclined wire section
92 winding heads

What is claimed is:

1. A device for producing rotors or stators of electric machines, comprising:
   a winding device which has a winding head with a rotatable former,
   wire shifters and a wire feed device for generating a winding with multiple turns, consisting of parallel webs and winding heads connecting the latter, and
   a transfer device, for transposing the winding onto the stator, or a transposing tool for subsequently transposing the winding onto the rotor, wherein the former is shorter than the winding to be generated and a rotating device is provided which effects a synchronous rotation of the former, the transfer device and the stator or the transposing tool about the axis of rotation of the former when the winding extends from the former to the stator or the transposing tool;
   wherein a winding head forming device is provided which brings the winding heads of the turns into their final form in the region of the transfer device.

2. The device as claimed in claim 1, wherein the transfer device has parallel holders for the turns of the winding, wherein the holders are designed on or between adjacent links of a link chain.

3. The device as claimed in claim 2, wherein the link chain between the former and the stator/transposing tool is guided in a linearly stretched fashion between two deflecting rollers.

4. The device as claimed in claim 1, comprising at least one of:
   first cams for transposing the turns from the transfer device into the radial grooves of the stator/transposing tool, and
   second cams for displacing the turns into the radial grooves, are provided radially on the inside.

5. The device as claimed in claim 4, wherein one or more of the first and second cams move in an adjustable fashion perpendicular to the direction of movement of the turns in the direction of movement of the turns.

6. The device as claimed in claim 4, wherein one or more of the first and second cams are designed in the form of ribs or disks and engage, through slots which run in the direction of movement of the transfer device or the direction of rotation of the transposing tool, into holders in the transfer device or the radial grooves of the transposing tool.

7. The device as claimed in claim 4, wherein one or more of the first and second cams move in an adjustable fashion perpendicular to the direction of movement of slopes in the direction of movement of the turns.

8. The device as claimed in claim 1, wherein a winding head clamping device temporarily clamps the turns/winding heads against the transfer device.

9. The device as claimed in claim 1, wherein at least the movement sequences of the device which relate to the displacement or rotation of the turns are synchronized mechanically by a main shaft or electronically by a suitable sensor system for detecting the movements in connection with movements controlled by servomotors.

10. The device as claimed in claim 1, wherein a winding head clamping device temporarily presses said turns/winding heads into the holders of the transfer device.

11. A device for producing rotors or stators of electric machines, comprising:
    a winding device which has a winding head with a rotatable former,
    wire shifters and a wire feed device for generating a winding with multiple turns, consisting of parallel webs and winding heads connecting the latter, and
    a transfer device, for transposing the winding onto the stator, or a transposing tool for subsequently transposing the winding onto the rotor, wherein the former is shorter than the winding to be generated and a rotating device is provided which effects a synchronous rotation of the former, the transfer device and the stator or the transposing tool about the axis of rotation of the former when the winding extends from the former to the stator or the transposing tool;
    wherein transposing pins are adjusted between an engaged position in which they engage in the turns of the winding and a retracted position, are provided at the transition point between the former and the transfer device, wherein, in the engaged position, they move synchronously during displacement with the transfer device, and, in the retracted position, a return to the axial starting situation takes place, counter to the direction of advance.

12. A device for producing rotors or stators of electric machines, comprising:
    a winding device which has a winding head with a rotatable former,
    wire shifters and a wire feed device for generating a winding with multiple turns, consisting of parallel webs and winding heads connecting the latter, and
    a transfer device, for transposing the winding onto the stator, or a transposing tool for subsequently transposing the winding onto the rotor, wherein the former is shorter than the winding to be generated and a rotating device is provided which effects a synchronous rotation of the former, the transfer device and the stator or the transposing tool about the axis of rotation of the former when the winding extends from the former to the stator or the transposing tool;
    wherein a bearing housing in which a transfer unit, with which a rotary bearing for the stator/transposing tool and the transfer device is associated, is mounted so that the transfer unit rotate about the axis of rotation of the former.

13. The device as claimed in claim 12, wherein the transfer unit and the former are coupled so that they are torsionally rigid.

* * * * *